United States Patent Office 3,440,063
Patented Apr. 22, 1969

3,440,063
EMULSION COMPOSITION AND PROCESS FOR USE IN AUTOMATIC CAR WASHES
Benjamin A. Chestochowski, Cincinnati, Edward J. Conklin, Forest Park, and Cecil A. Ellison, Cincinnati, Ohio, assignors to The Procter & Gamble Company, Cincinnati, Ohio, a corporation of Ohio
No Drawing. Filed Sept. 30, 1965, Ser. No. 491,886
Int. Cl. C09f 9/00; C08h 17/00, 9/00
U.S. Cl. 106—8
8 Claims

ABSTRACT OF THE DISCLOSURE

An emulsion composition for use in automatic car washes comprising a monoester ($C_6$–$C_{12}$ moieties), an acetic acid salt of a fatty amine, a hydrotrope, a short chain alcohol and water; processes for removing water from automobiles utilizing said emulsion compositions.

---

The present invention relates to a novel emulsion composition which facilitates removal of water from metallic surfaces and which leaves thereon a high luster. The present invention also relates to a process for the use of this novel emulsion composition.

Since the advent of the commercial car wash, operators of these establishments have searched for a more effective, more economical, and faster method of removing water from freshly washed automobiles. Originally, the water was simply removed manually by wiping with hand towels. As the industry became more mechanized, warm air jets directed at the automobiles were found to be helpful in removing most of the water prior to the final water removal step in which hand towels were utilized.

It was found that the water was more easily removed by the air jets if it was first beaded or formed into droplets. Accordingly, it was discovered that most petroleum and fatty materials when discretely sprayed onto the surface of the automobile after it had been washed would cause the water to bead and thus facilitate its subsequent removal. Unfortunately, some of these petroleum and fatty compounds were harmful to the finish of the automobile; others left the windows streaked and left unsightly deposits on the automobile; most had no polishing properties. As the search continued, mineral oil was found to have some advantageous properties and became one of the leading water removal agents in commercial car wash establishments. However, while it did not harm the automobile finish, the mineral oil did cause streaking of automobile windows. In addition, mineral oil did not leave a long lasting shine on the treated surface.

Accordingly, it is an object of this invention to provide a novel emulsion composition which when applied to the surface of a freshly washed automobile will cause the excess water to bead or form droplets. It is a further object of this invention to provide an emulsion composition which will impart smoothness to the finish of automobiles, thus further facilitating the final removal of waters. A further object of this invention is to provide an emulsion composition which will impart a long-lasting luster to the finish of automobiles, thus providing a simultaneous washing and polishing process. Another object of this invention is to provide an emulsion composition which is clear and stable and has good freeze recovery. A still further object is to provide an emulsion composition which is easily removed from automobile windows with a minimum of streaking.

Still further objects and the entire scope of applicability of the present invention will become apparent from the detailed description given hereinafter; it should be understood, however, that the detailed description and specific examples, while indicating preferred embodiments of the invention, are given by way of illustration only since various changes and modifications within the spirit and scope of the invention will become apparent to those skilled in the art from this detailed description.

It has now been discovered, according to the present invention, that the foregoing objects are attained with a novel emulsion composition comprised of the following components: from about 5% to about 80% of an ester having from about 6 to about 12 carbon atoms in each moiety, from about 5% to about 25% of an acid salt of a fatty amine, from about 0% to about 10% of a lower molecular weight saturated aliphatic alcohol having from about 2 to about 4 carbon atoms, from about 1.5% to about 8% of a hydrotrope, and from 2% to about 80% water.

The esters utilized in the emulsion compositions described herein have moieties containing from about 6 to about 12 carbon atoms. More particularly, the esters of this novel composition can be conveniently described as the esters of straight or branched chain saturated aliphatic alcohols containing from about 6 to about 12 carbon atoms, and preferably from 8 to 10 carbon atoms, and straight or branched chain saturated aliphatic acids having from about 6 to about 12 carbon atoms, and preferably from 8 to 10 carbon atoms.

The esters of the present invention are particularly important in this composition as they assist in beading the water and facilitate its removal. They impart smoothness to the automobile finish, thus facilitating the final removal of water by rubbing the finish with towels. Additionally, these esters impart a deep, long-lasting luster to the automobile finish. In addition, these esters provide the further advantage of being easily removed from the windows of automobiles without streaking.

It is particularly surprising that only this relatively small range of esters displays these advantageous characteristics. The esters with moieties over 12 carbon atoms, which are outside the delineated range of this invention, are generally solid at room temperature and, therefore, present manufacturing and formulating problems; for example, liquifying the esters and transporting and storing them. Additionally, during cool weather applications, these esters are more likely to solidify on windows, thus leaving unsightly deposits and causing streaking of the windows. Again, if an emulsion containing these higher molecular weight esters should split, these solid esters would be very difficult to remove from the spray lines, while the liquid esters used herein would easily flow from those lines. The esters having moieties of less than 6 carbon atoms do not leave as high a luster on the automobile finish as that left by the esters herein described. Additionally, they do not cause the water to bead in the same desirous fashion as do the esters of this invention.

Examples of specific esters which are suitable for use in this invention are hexyl hexanoate, hexyl octanoate, hexyl decanoate, octyl hexanoate, octyl octanoate, octyl decanoate, octyl undecanoate, decyl hexanoate, decyl octanoate, decyl decanoate, decyl undecanoate, undecyl octanoate, undecyl decanoate, undecyl undecanoate, 2-ethylhexyl dodecanoate, 2-ethylhexyl hexanoate, 2-propylhexyl octanoate, 2-ethyloctyl octanoate, and 3-ethyloctyl octanoate. The esters of this invention can be utilized alone or they can be utilized in admixture with each other in any proportions. In fact, according to a preferred embodiment of the present invention, a mixture of esters derived from natural sources is utilized in this composition.

One example of these preferred esters, essentially octyl octanoate, can be prepared by the alcoholysis of a mixture of light cut coconut methyl esters with a mixture of light cut coconut alcohols. It is to be understood that light cut coconut, in this context, refers to a coconut oil fraction obtained from distillation which contains the following distribution of carbon chain lengths: 4% $C_6$, 60% $C_8$, 35% $C_{10}$ and 1% $C_{12}$. The product of this reaction is a mixture of esters having moieties comprised of 4% alkyl chain lengths containing 6 carbon atoms, 60% alkyl chain lengths containing 8 carbon atoms, 35% alkyl chain lengths containing 10 carbon atoms and 1% of alkyl chain lengths containing 12 carbon atoms. An essentially octyl dodecanoate ester can be prepared in the same manner by utilizing a mixture of middle cut coconut methyl esters, e.g., 1% $C_{10}$, 68% $C_{12}$, 24% $C_{14}$, and 7% $C_{16}$, and a mixture of light cut coconut alcohols. An essentially dodecyl octanoate can be prepared by utilizing a mixture of light cut coconut methyl esters and a mixture of middle cut coconut alcohols. Middle cut refers to a fraction from distillation as described above.

An analysis of these coconut cut esters follows:

TABLE I.—ANALYSIS OF ESTER MIXTURES

|  | Essentially octyl octanoate | Essentially octyl dodecanoate | Essentially dodecyl octanoate |
|---|---|---|---|
| Molecular weight | 723 | 318 | 337 |
| Saponification value | 203 | 176 | 167 |
| Acid value | 0.05 | 0.02 | 0.10 |
| Iodine value | 0.09 | 0.10 | 0.06 |
| Hydroxyl value | 1.03 | 1.03 | 0.77 |
| Melting point (° C.) | −13 | 9 | 12 |
| Specific gravity (25°/25° C.) | 0.856 | 0.856 | 0.54 |

These esters are clear, mobile liquids with high boiling points and high flash points. They are very soluble in common organic solvents but insoluble in water.

As described above, the esters utilized in this composition can be prepared by the process known as alcoholysis. During this reaction, the alcohol moiety of an ester of an organic acid is replaced by that of another alcohol of different chain length. Methyl esters of octanoic or decanoic acids can, accordingly, be permitted to react with alcohols containing 6 to 12 carbon atoms to obtain the esters of this invention. Catalysts suitable for use in this reaction are strong bases such as the aluminum alkoxide of the free alcohol, sodium methoxide, or acids such as sulfuric or hydrochloric acid. Other methods suitable for preparation of these esters are described in Kelley, Organic Chemistry, 2nd edition (1957) at pages 167–69. It is not intended that the ester of this novel composition be limited to any particular source or method of preparation; the only restriction on this ester is embodied in the description of the moieties.

About 15% by weight of the ester component can, without adverse effects, be comprised of alcohol and acid moieties which deviate by up to about 4 carbon atoms from the delineated carbon atom limits for the ester component. Above this level, however, there are decreased performance results and increased formulation problems.

It has been found that the esters of this invention impart a high luster to the finish of automobiles and facilitate removal of water therefrom. To gain further advantages, however, it was discovered that it is necessary to emulsify these esters in water or other suitable diluents discussed hereinafter. When the esters, by weight of the total composition in its non-diluted form, make up less than 5% of the emulsion, their performance is poor. It has been found most advantageous to utilize from 15% to 80% of these esters in the emulsion composition of this invention. As a further more preferred embodiment of this invention, from about 35% to about 45% of this emulsion composition is comprised of these esters.

In a further preferred embodiment of this invention, the above-described esters can contain from about 1% to about 2% of fatty alcohols having from about 8 to about 12 carbon atoms and methyl esters having from about 6 to about 12 carbon atoms in the acyl moiety. These materials apparently help to stabilize the finished emulsion. It has also been found that the presence of these materials facilitates formulation of the finished emulsion. As an additional advantage, esters containing small amounts of unreacted materials, i.e., fatty alcohols and methyl esters, are generally less expensive to buy or make, as several processing steps can be eliminated.

Water is an essential component in the composition of this invention as it materially aids the stability of the composition while in storage. The amount of water present in this composition can vary, on a weight basis of the total composition, from about 2% to about 80%. In a preferred embodiment, water comprises from about 20% to about 50% by weight of the total composition. It should be emphasized that the upper limit on water is not critical as, in the final end use, the composition of this invention may be diluted with up to 500 parts of water per part of the composition of this invention.

The acid salts of the fatty amines utilized in this invention are cationic emulsifiers. They impart stability to the ester and water emulsion of this invention and prevent layering of the various ingredients. In addition, they impart excellent freeze-thaw recovery properties to this composition. Additionally, these salts impart to this emulsion the unusual property of "plating out" the ester component onto most surfaces. This property makes it possible to exhaust the ester component from the emulsion, thus aplying more ester than can be done with other emulsions of equal concentration. Additionally, the resulting ester film applied from these emulsions becomes water-repellent immediately after drying, thus protecting the automobile finish.

The acid salts of fatty amines utilized in this invention may be represented as follows:

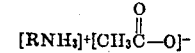

wherein R represents a straight or branched chain alkyl group derived from fatty acids ranging in chain length from 8 to 18 carbon atoms. The carbon chain can be saturated or unsaturated. The chain length and degree of unsaturation largely regulate the solubility behavior of these chemicals in oil and water systems. Acetic acid salts represent a preferred embodiment of this invention. However, other lower alkyl carboxylic acid salts may be used in place of the acetic acid salt or in admixture therewith. Examples include formic acid salts, propanoic salts, and the like. The compounds can be used either alone, i.e., containing R groups of a given carbon atom content, or in admixture with each other in any proportions.

Specific formulations of suitable mixtures of acetic acid salts of fatty amines follow:

TABLE II

| Alkyl chain length | Acetic acid salts of fatty amines | | | | |
|---|---|---|---|---|---|
|  | I | II | III | IV | V |
| Octyl 8, percent | 4 |  |  |  | 8 |
| Decyl 10, percent | 90 | 2 |  |  | 9 |
| Dodecyl 12, percent | 6 | 95 | 4 |  | 47 |
| Tetradecyl 14, percent |  | 3 | 92 |  | 18 |
| Hexadecyl 16, percent |  |  | 4 | 7 | 8 |
| Octadecyl 18 saturated, percent |  |  |  | 90 | 5 |
| Octadecyl 18 monosaturated, percent |  |  |  | 3 | 5 |
| Melting point (° C.) | 60 | 65 | 70 | 85 | 55 |
| Mean molecular weight | 217 | 245 | 273 | 329 | 260 |

A preferred embodiment in the practice of this invention is the use of a particular mixture of acetic acid salts of fatty amines. This component contains an alkyl mixture comprised of 1% $C_{14}$, 28% $C_{16}$, 25% $C_{18}$ and 46% $C_{18}$ (monounsaturated). The mean molecular weight of this compound is 322 and its melting point is 55° C.

The amount of the acid salts of fatty amines present in the composition of this invention can vary from about 5% to about 25% by weight of the total composition. In a preferred embodiment of this invention, from 11.5% to 14.5% of the preferred acetic acid salt of fatty amine is utilized herein. The specific amount of acetic acid salts of the fatty amines which should be utilized in the present composition depends to considerable degree upon the amount of the ester employed. The weight ratio of the fatty amine acid salts to the ester should be in the range of from about 1:2 to about 1:5 and preferably in the ratio of salt to ester of 1:3 to 1:4.

As a particularly surprising element of this invention, it has been found that an anionic hydrotope can be utilized in combination with the cationic acid salts of the fatty amines without concomitant chemical reaction or combination of these two compounds. In fact, it unexpectedly has been discovered that, rather than interfere with each other, these compounds cooperate to form a highly desirably and effective emulsion composition.

Suitable hydrotropes to increase the compatibility of the components of the formulation of this invention are alkali metal salts of aryl sulfonates. Preferred alkali metal aryl sulfonates include sodium and potassium benzene sulfonate, sodium and potassium xylene sulfonate, and sodium and potassium toulene sulfonate. Especially preferred in the novel emulsion composition of this invention is potassium toluene sulfonate. As used herein the hydrotropes are, by weight, about 50% solids and about 50% water. Thus, in some cases the water essential for this emulsion composition may be supplied by the hydrotrope.

The hydrotropes act as coupling and solubilizing agents for the esters and fatty amine acid salt of this invention. Without the use of the hydrotrope, only about 27% of the total composition can be comprised of the esters described hereinbefore. With the use of these hydrotropes, up to 80% of the total composition can be comprised of these esters without layering. The addition of the hydrotropes are, by weight, about 50% solids and about 50% ing of the automobile windows, apparently because of their coupling effect. These hydrotropes display the added advantage of eliminating an initial and troublesome thickening stage when the acid salts of the fatty amines are combined with the esters hereinbefore described.

The hydrotrope is added at levels sufficient to achieve homogeneity which range from about 1.5% to about 8.0% by weight of the emulsion composition. Levels of from about 3.5% to about 5.5% are preferred. The upper limit of 8% is dictated by the dilution effect on the product of an ingredient which does not contribute substantially to beading the water on the automobile or contribute to producing a lasting luster or sheen on the finish. The lower limit is the amount required to achieve a homogeneous emulsion. The above figures refer to the total weight of a 50% solids-50% water mixture.

It will be appreciated that it is necessary that the formulations of this invention should be homogeneous at somewhat lower temperatures than usual room temperature. The amount of hydrotrope used is preferably the minimum amount which prevents phase separation throughout the temperature ranges to which the product is likely to be subjected. This amount is determined by the levels of ester and fatty amine acid salts employed.

It is also desirable to employ a straight or branched chain saturated aliphatic alcohol having from about 2 to about 4 carbon atoms to assist in obtaining a homogeneous emulsion. Examples of alcohols suitable for use in this invention are ethanol, propanol, 2-propanol, butanol, 2-butanol, and 2-menthyl-2-propanol. Particularly preferred herein is 2-propanol as it gives the best pound-for-pound performance.

It has been found that by employing these alcohols in an amount from about 0% to about 10% by weight of the total emulsion composition, a substantial decrease in cloudiness of the emulsion is apparent. Levels of from 4.5% to 5.5% are preferred in this emulsion composition. The upper limit of 10% is again dictated by its dilution effect in the emulsion and the concomitant decrease in efficiency of the composition. The lower limit is the amount required to achieve a substantially non-cloudy emulsion.

The emulsion of this invention is usually prepared in the following manner. The liquid ester is admixed with the hydrotrope and the solid fatty amine acetates. This mixture is heated to approxamately 60° C., at which point the fatty amine acetate melts and forms a slightly cloudy composition. This temperature may vary somewhat, depending upon the particular fatty amine acetate utilized. In some cases, a higher temperature of nearly 85° C. must be attained before the fatty amine acetate will melt and form a homogeneous mixture with the hydrotrope and ester. This mixture is then cooled to just above the solidification point of the mixture, at which point the alcohol component of this novel composition is admixed in order to obtain a clear mixture. This cooling step is necessary primarily to prevent "flash off" or rapid evaporation of the alcohol. To this mixture is then added water to form the preferred composition of this invention. Care must be taken to add water which is above about 50° C., as the addition of water at a lower temperature will again create a cloudy emulsion. This final emulsion composition is then stable and remains in liquid form at temperatures down to about 10° C. Even in the event that this emulsion should freeze, its excellent freeze-thaw recovery properties provide a stable emulsion when ordinary temperatures are again attained.

The final emulsion composition is very difficult to characterize in terms of continuous and discontinuous phases. To the naked eye, the composition, in its preferred embodiments, is a light amber liquid which appears to be a clear solution. On closer inspection with a phase microscope, a continuous and a discontinuous phase can be discerned. However, the refractive indices of both phases are so near the refractive index of the composition as a whole that no further conclusions can be conclusively made. It is believed, however, that the emulsion composition, in its preferred embodiments, is an oil in water emulsion; that is to say that microscopic droplets of the ester are unformly dispersed throughout a continuous water phase. When a larger percentage of ester and a correspondingly smaller amount of water are employed in this composition, it is believed that the continuous phase will be comprised of the ester and the discontinuous phase will be comprised of water. No definite point has been established for this phase conversion. Although this characterization is helpful from an analytical standpoint, it does not effect the beneficial advantages attained through the use of the composition of this invention.

When this emulsion is applied to automobiles, it is preferably diluted with a major portion of water. As used herein, a major portion of water refers to from about 10 to about 800 parts of water per part of the composition of this invention. In all these concentrations, the excess water on the automobiles is beaded. However, with higher concentrations of the emulsion composition of this invention, a glossier, longer-lasting finish is attained. As a preferred embodiment of this invention, from about 150 to about 250 parts of water are used per part of the composition of this invention.

The composition of this invention is preferably applied by spraying it onto the automobiles after they have been rinsed in an automatic car wash. In the usual application, this diluted composition is applied to the automobile finish by means of spray nozzles mounted on an archway through which the automobile is conveyed. The excess water in its beaded form is then removed from the automobile by using jets of warm air directed tangentially to the automobile surfaces. The composition of this invention could also be applied in any other manner which insures contacting all the finished surfaces of the automobile.

It is, thus, understood that this invention includes the process of removing water from the exterior of automobiles comprising the steps of (1) applying the emulsion composition of this invention to wet automobiles whereby the water is formed into beads; and (2) removing the beaded water. In a preferred embodiment herein, the water is removed by pressurized air. The composition of this invention may also be employed as a water removal agent in other fields such as an aid in removing water from industrial machinery or in any application where surface water is to be removed and the individual components of the present emulsion are not harmful to the treated surface.

It is understood that other materials can be added to the composition of this invention such as color or perfume. Minor amounts of silicones can also be added to further create a smoother feeling and assist in removing the water from the automobile.

The following specific examples are given in order to further clarify and illustrate this invention and are not intended to limit the scope of this invention in any way.

The following formulation was prepared:

EXAMPLE I

| | Parts by weight, percent |
|---|---|
| Octyl octanoate ester [1] | 40.3 |
| Acetate salt of fatty amine [2] | 12.4 |
| Potassium toluene sulfonate (50% solids-50% water) | 4.2 |
| 2-propanol | 5.1 |
| Water | 38.0 |

[1] The Octyl Octanoate Ester utilized herein was prepared by the alcoholysis of a mixture of methyl esters with a mixture of fatty alcohols. The moieties of the octyl octanoate ester consisted of light cut coconut fractions of the following approximate composition: 4% of $C_8$, 60% of $C_8$, 35% of $C_{10}$, and 1% of $C_{12}$. This mixture contained 1% of unreacted methyl esters and alcohol.
[2] The alkyl group of the acetate salt of fatty amine utilized herein was comprised of 1% $C_{14}$, 28% $C_{16}$, 25% $C_{18}$ and 46% $C_{18}$ (monosaturated). Its mean molecular weight was 322 and its melting point was 55° C.

The octyl octanoate, acetate salt of fatty amine, and potassium toluene sulfonate were charged into a stainless steel drum and heated to 60° C. As soon as the mass was liquid and homogeneous, it was cooled to 54° C. and the 2-propanol was admixed therein. Water at a temperature of 50° C. was then homogeneously admixed with the composition. This finished emulsion was found to be stable and clear.

Other hydrotropes may be utilized in place of potassium toluene sulfonate, such as sodium or potassium benzene sulfonate, sodium or potassium xylene sulfonate or sodium toluene sulfonate. Other ingredients within the hereinbefore delineated limits may also be utilized in this example.

The stable, clear emulsion was applied to automobiles in the following manner. The automobiles were passed through a completely mechanized commercial car washing operation wherein water containing a detergent composition was directed at the automobile. Simultaneously therewith, the automobile was subjected to rubbing with mechanical rotary brushes to loosen and remove foreign particles on the automobile. This was followed by a complete fresh water rinse. At this point, the novel emulsion of this example, which had been admixed with 200 parts of water per part of emulsion, was sprayed uniformly over the surfaces of the automobile. Water standing on the automobile was immediately formed into beads or droplets. It was found that this water was easily removed when the automobile was subjected to jets of air directed tangentially to the surfaces of the automobiles. The final water removal was accomplished by means of hand towels. The surface of the automobile was noticeably smoother and the water was removed easily from the automobile finish. Additionally, the emulsion composition was easily removed from the windows and caused no streaking problems. After this process was completed, the automobile finish had a high sheen and deep luster which lasted for several weeks.

EXAMPLE II

The following formulations were prepared in the same manner as the formulation of Example I.

| | Formulation | |
|---|---|---|
| | I | II |
| Octyl octanoate ester [1] | 20.0 | 67.8 |
| Acetate salt of fatty amine [2] | 6.0 | 20.3 |
| Potassium toluene sulfonate (50% solids-50% water) | 2.0 | 5.1 |
| 2-propanol | 1.5 | 6.8 |
| Water | 70.5 | 0.0 |

[1],[2] As described in Example I.

Both of these formulations were stable emulsions. When applied to automobiles in the manner described in Example I, these emulsions beaded the water satisfactorily, imparted smoothness to the finish of the automobiles and imparted a high luster to the finish of the autmobiles. As might be expected, Formulation II gave the highest luster concomitant with having the largest concentration of ester and fatty amine acetate. In Formulation II, the essential ingredient, water, was supplied in conjunction with the hydrotrope.

The foregoing description of the invention has been presented describing certain operable and preferred embodiments. It is not intended that the invention should be so limited, since variations and modifications thereof will be obvious to those skilled in the art, all of which are within the spirit and scope of this invention.

What is claimed is:
1. An emulsion composition comprised of
   (a) from about 5% to about 80% by weight of the total composition of a monoester having monohydric alcohol and monobasic acid moieties containing from about 6 to about 12 carbon atoms respectively;
   (b) from about 5% to about 25% by weight of the total composition of an acetic acid salt of a fatty amine of the general formula

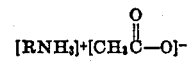

wherein R represents a saturated or unsaturated, straight or branched chain alkyl group containing from about 8 to about 18 carbon atoms;
   (c) from about 1.5% to about 8% by weight of the total composition of an alklali metal salt of a hydrotrope selected from the group consisting of benzene sulfonates, xylene sulfonates, and toluene sulfonates;
   (d) from about 0% to about 10% by weight of the total composition of a saturated straight or branched chain aliphatic monohydric alcohol containing from about 2 to about 4 carbon atoms; and
   (e) from 2% to about 80% water by weight of the total composition.
2. An emulsion composition comprised of
   (a) from about 15% to about 80% by weight of the total composition of a monoester having monohydric alcohol and monobasic acid moieties containing from about 6 to about 12 carbon atoms respectively;
   (b) an acetic acid salt of a fatty amine of the general formula

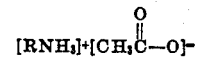

wherein R represents a saturated or unsaturated, straight or branched chain alkyl group containing from about 8 to about 18 carbon atoms, in a weight ratio to the said ester of from about 1:2 to about 1:5;
   (c) from about 1.5% to about 8.0% by weight of the total composition of an alkali metal salt of an aryl sulfonate selected from the group consisting of sodium benzene sulfonate, sodium xylene sulfonate, sodium toluene sulfonate, potassium benzene sulfonate, potassium xylene sulfonate, and potassium toluene sulfonate;
(d) from about 0% to about 10% by weight of the total composition of a saturated straight or branched chain aliphatic monohydric alcohol containing from about 2 to about 4 carbon atoms; and
(e) from 2% to about 80% water by weight of the total composition.

3. The emulsion composition of claim 2 wherein from about 1% to about 2% by weight of the said monoester is comprised of a mixture of monohydric alcohols containing from about 8 to about 12 carbon atoms and methyl monoesters containing in the monobasic acyl moiety from about 6 to about 12 carbon atoms.

4. The emulsion composition of claim 3 wherein the said acetic acid salt of a fatty amine is present in a weight ratio to the said monoester of from about 1:3 to about 1:4.

5. An emulsion composition comprised of
(a) from about 35% to about 45% by weight of the total composition of a monoester having monohydric alcohol and monobasic acid moieties containing from about 8 to about 10 carbon atoms respectively, said monoester containing from about 1% to about 2% by weight of a mixture of monohydric alcohols containing from about 8 to 12 carbon atoms and methyl monoesters containing in the monobasic acyl moiety from about 6 to about 12 carbon atoms;
(b) from about 11.5% to about 14.5% by weight of the total composition of an acetic acid salt of a fatty amine of the general formula

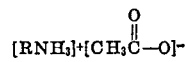

wherein R represents an alkyl mixture comprised of 1% $C_{14}$, 28% $C_{16}$, 25% $C_{16}$, and 46% $C_{18}$ monounsaturated;
(c) from about 3.5% to about 5.5% by weight of the total composition of potassium toluene sulfonate;
(d) from about 4.5% to about 5.5% by weight of the total composition of 2-propanol;
(e) from about 20% to about 50% water by weight of the total composition.

6. An emulsion composition comprised of
(a) 40.3% by weight of the total composition of monoesters having monohydric alcohol and monobasic acid moieties comprised respectively of 4% alkyl chain lengths containing 6 carbon atoms, 60% alkyl chain lengths containing 8 carbon atoms, 35% alkyl chain lengths containing 10 carbon atoms, and 1% of alkyl chain lengths containing 12 carbon atoms, said monoester containing about 1% to about 2% by weight of a mixture of monohydric alcohols containing from about 8 to about 12 carbon atoms and methyl monoesters containing in the monobasic acyl moiety from about 6 to about 12 carbon atoms;
(b) 12.4% by weight of the total composition of a mixture of acetic acid salts of a fatty amine of the general formula

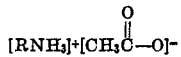

wherein R represents an alkyl mixture comprised of 1% $C_{14}$, 28% $C_{16}$, 25% $C_{18}$ and 46% $C_{18}$ monounsaturated;
(c) 4.2% by weight of the total composition of potassium toluene sulfonate;
(d) 5.1% by weight of the total composition of 2-propanol;
(e) 38.0% water by weight of the total composition.

7. The process of removing water from the exterior of automobiles comprising the steps of
(A) applying to wet automobiles an emulsion composition comprised of
(a) from about 5% to about 80% by weight of the total composition of a monoester having monohydric alcohol and monobasic acid moieties containing from about 6 to about 12 carbon atoms respectively;
(b) from about 5% to about 25% by weight of the total composition of an acetic acid salt of a fatty amine of the general formula

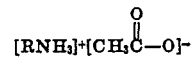

wherein R represents a saturated or unsaturated, straight or branched chain alkyl group containing from about 8 to about 18 carbon atoms;
(c) from about 1.5% to about 8% by weight of the total composition of an alkali metal salt of a hydrotrope selected from the group consisting of benzene sulfonates, xylene sulfonates and toluene sulfonates;
(d) from about 0% to about 10% by weight of the total composition of a saturated straight or branched chain aliphatic monohydric alcohol containing from about 2 to about 4 carbon atoms; and
(e) from about 2% to about 80% water by weight of the total composition; said emulsion composition being diluted with a major portion of water; whereby the water on the wet automobiles is formed into beads; and thereafter
(B) removing the beaded water.

8. The process of removing water from the exterior of automobiles comprising the steps of
(A) spraying wet automobiles with an emulsion comprised of
(a) 40.3% by weight of the total composition of monoesters having monohydric alcohol and monobasic acid moieties comprised respectively of 4% alkyl chain lengths containing 6 carbon atoms, 60% alkyl chain lengths containing 8 carbon atoms, 35% alkyl chain lengths containing 10 carbon atoms, and 1% of alkyl chain lengths containing 12 carbon atoms, said monoester containing from about 1% to about 2% by weight of a mixture of monohydric alcohols containing from about 8 to about 12 carbon atoms and methyl monoesters containing in the monobasic acyl moiety from about 6 to about 12 carbon atoms;
(b) 12.4% by weight of the total composition of a mixture of acetic acid salts of fatty amines of the general formula

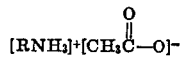

wherein R represents an alkyl mixture comprised of 1% $C_{14}$, 28% $C_{16}$, 25% $C_{18}$ and 46% $C_{18}$ monounsaturated;
(c) 4.2% by weight of the total composition of potassium toluene sulfonate;
(d) 5.1% by weight of the total composition of 2-propanol;
(e) 38.0% by weight of the total composition of water: said emulsion composition being diluted with from about 150 to about 250 parts of water per part of said composition; whereby the water on the wet automobiles is formed into beads; and thereafter (B) removing the beaded water by means of pressurized air.

References Cited

UNITED STATES PATENTS

| | | | |
|---|---|---|---|
| 2,406,336 | 8/1946 | Auer | 106—10 |
| 2,584,413 | 2/1952 | Baer et al. | 106—11 |
| 3,094,735 | 6/1963 | Hanlon | 106—10 |
| 3,142,590 | 7/1964 | Hergonson | 134—7 |
| 3,222,201 | 12/1965 | Boyle et al. | 106—3 |

FOREIGN PATENTS 810,560  3/1959  Great Britain.

JULIUS FROME, *Primary Examiner.*

J. B. EVANS, *Assistant Examiner.*

U.S. Cl. X.R.

106—9, 10, 271; 117—104, 105.3, 127, 134, 167; 148—6.24; 252—148, 151